United States Patent
Kim et al.

(10) Patent No.: US 7,711,782 B2
(45) Date of Patent: May 4, 2010

(54) EVENT NOTIFICATION METHOD IN WIRELESS COMMUNICATIONS SYSTEM

(75) Inventors: Young-Jin Kim, Seoul (KR); Chan-Seok Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 714 days.

(21) Appl. No.: 11/362,423

(22) Filed: Feb. 23, 2006

(65) Prior Publication Data

US 2006/0195591 A1 Aug. 31, 2006

(30) Foreign Application Priority Data

Feb. 25, 2005 (KR) .................. 10-2005-0016014

(51) Int. Cl.
*G06F 15/16* (2006.01)
*G06F 15/173* (2006.01)

(52) U.S. Cl. .............. 709/206; 709/204; 709/223; 709/224; 709/227; 709/236

(58) Field of Classification Search .......... 709/220, 709/230, 201–203, 205–207, 318, 331–332, 709/200, 227, 223–224, 236, 204; 434/350; 707/104; 455/415, 435, 407
See application file for complete search history.

(56) References Cited

U.S. PATENT DOCUMENTS

| 6,208,996 B1 * | 3/2001 | Ben-Shachar et al. .... | 707/104.1 |
| 6,292,825 B1 * | 9/2001 | Chang et al. ................ | 709/206 |
| 6,745,193 B1 * | 6/2004 | Horvitz et al. .............. | 707/101 |
| 2002/0075880 A1 * | 6/2002 | Dolinar et al. ............. | 370/401 |
| 2003/0044760 A1 * | 3/2003 | Banerjee et al. ............. | 434/350 |
| 2004/0260749 A1 * | 12/2004 | Trossen et al. .............. | 709/200 |
| 2006/0156398 A1 * | 7/2006 | Ross et al. ..................... | 726/22 |

FOREIGN PATENT DOCUMENTS

KR 1020040003939 A 1/2004

OTHER PUBLICATIONS

Adam Roach, Session Initiation Protoco (SIP)—Specific Event Notification, Jun. 2002, RFC 3265.*
Jonathan Rosenberg, A Presence Event Package for the Session Initiation Protocol (SIP), Aug. 2004, RFC3856.*
"Session Initiation Protocol (SIP) Event Notification Throttle Mechanism", A. Niemi, Nokia Research Center, Feb. 21, 2005, pp. 1-15.
Niema A., Session Initiation Protocol (SIP) Event Notification Throttle Mechanism, Internet-Draft, Feb. 21, 2005.

* cited by examiner

*Primary Examiner*—Quang N. Nguyen
*Assistant Examiner*—Benjamin M Thieu
(74) *Attorney, Agent, or Firm*—Lee, Hong, Degerman, Kang & Waimey (57) ABSTRACT

An event notification method in a wireless communications system can reduce the amount of transmission data in a wireless section and improve transmission efficiency by reducing the number of notifications with respect to an event which is frequently generated as a user sends a server an event notification request message including period information through a SIP-based client in order to request the notification with the specific event, and the server sends an event notification message to the client according to a period included in the period information or when a permitted time range is satisfied in order to notify the event when the corresponding event is generated.

15 Claims, 4 Drawing Sheets

Via: SIP/2.0/UDP
Route: <sip:120.10.5.55>
Max-Forwards: 70
<u>Notify-Period: 300</u>
<u>Max-Period: 310</u>        ← additional function
Privacy: none
<u>Event: clientPS.info</u>        ← Event name
Accept: application/cpim-pidf+xml
Allow:
CONF,REFER,NOTIFY,MESSAGE,PUBLISH,INFO,UPDATE,SUBSCRIBE,
REGISTER,INVITE,ACK,CANCEL,BYE
Supported: REPLACES
From: client01@lge.com
To: imps@openmobilealliance.org
Call-ID: 123456-789
Cseq: 1 SUBSCRIBE
Contact: <client01@lge.com>
<u>Expires: 1800</u>        ← Effective time of the Event

FIG. 4

EVENT NOTIFICATION METHOD IN WIRELESS COMMUNICATIONS SYSTEM

CROSS REFERENCE TO RELATED APPLICATION

Pursuant to 35 U.S.C. §119(a), this application claims the benefit of earlier filing date and right of priority to Korean Application No. 10-2005-0016014, filed Feb. 25, 2005, the contents of which are hereby incorporated by reference herein in their entirety.

BACKGROUND OF THE INVENTION

1. Field of the Invention

The present invention relates to a wireless communications system, and more particularly, to an event notification method in a wireless communications system which allows notification about an event, which is frequently generated, to be performed at specific time intervals by controlling time intervals of the event notification.

2. Description of the Background Art

SIP (Session Initiation Protocol) is a text-based protocol such as HTTP (Hypertext Transfer Protocol), in which one or more clients set up, modify and complete sessions. That is, the SIP is based on a client/server structure whereby if a client starts to make a call, a server responds to the calls. A voice communication service, an Instant Messaging service, a PoC (Push to talk of Cellular) service, or the like can be implemented by using an identifier having an address system similar to that used for an e-mail.

The SIP-based client subscribes with the server to be notified when a specific event is generated. The server sends an Event Notification to the corresponding SIP-based client when a specific event, to which the SIP-based client subscribes, is generated.

That is, the SIP-based clients subscribe with the server to a resource or call states for various resources, and notify the server when their own states are modified. In addition, the server sends an event notification to another SIP-based client which subscribe to be notified each time the states of the SIP-based clients are modified or each time the subscribed event is generated. Here, various SIP services can be implemented by using the event notification, such as a call-back service based on a terminal state event, a "buddy list" service based on a user presence event, a message wait indication service based on a mailbox state modification event, a PINT (PSTN/Internet Interworking) state service based on a call state event, or the like.

In an event notification method of the related art, since event notifications are sent to clients which subscribe to be notified whenever the subscribed event is generated, as corresponding events are generated more frequently or as more clients subscribe to the notification method with respect to the corresponding event, the server should transmit an increased amount of data as event notifications increase.

Hereafter, an exemplary procedure will be described with the assumption that a service is based on the user presence event.

The SIP-based client has a buddy list of other clients in order to use an instant messaging service or a PoC (Push-to-talk over Cellular) service. The buddy list is managed by a Presence Server. The presence server notifies a corresponding SIP client of presence information during a particular period of effective time after the SIP-based client subscribes to receive the presence information.

The SIP-based client notifies the presence server of any modified presence information if its own presence information is modified. The presence server sends an event notification in real-time to another client which subscribes to be notified of the modified presence information of the client. That is, as the number of buddies included in the buddy list increases, the amount of data transmitted over the wireless interface increases. Thus, transmission efficiency over the wireless interface is decreased.

As an another example of a related art method of notifying a corresponding event whenever a subscribed event is generated, there is provided a method of notifying a state regarding an event requested by the user at a specific point in time requested by the user.

In case of the service based on the user presence event, the user transmits a buddy list update request signal to the presence server at a specific point in time by using the SIP-based client, and the presence server receiving the buddy list update request signal transmits a response signal including presence information of the clients included in the corresponding buddy list to the SIP-based client.

However, the presence information update requested by the user is not an event notification method by which the user is automatically notified of a specific event on a subscription basis since the user should make a request at every point in time when the user checks specific information.

In addition, since the presence information of the buddy list is updated only when the user makes a request, the amount of data which should be transmitted at a time increases, a status of the buddy list cannot be checked in real-time, and thus the user is inconvenienced because his buddy list should be frequently checked.

BRIEF DESCRIPTION OF THE INVENTION

An important aspect of the present invention is that the present inventors recognized certain drawbacks of the related art, as mentioned above. As a result, the present inventors provided a solution to such drawbacks, as follows.

An object of the present invention is to provide an event notification method in a wireless communications system reducing the amount of data generated by controlling a minimum time interval for an event notification.

Another object of the present invention is to provide an event notification method in a wireless communications system reducing the amount of data generated by controlling a minimum time interval for a notification on an event which is frequently generated.

Another object of the present invention is to provide an event notification method in a wireless communications system in which a user can control a minimum time interval with respect to an event notification.

Another object of the present invention is to provide an event notification method in a wireless communications system in which an event notification time interval is adjusted within a range of guaranteeing an event notification being performed in real time.

To achieve these and other advantages and in accordance with the purpose of the present invention, as embodied and broadly described herein, there is provided an event notification method in a wireless communications system, comprising: a step in which a client sends a server an event notification request message including period information on a specific event notification; and a step in which the server notifies the client of the corresponding event if the period information is satisfied when the corresponding event is generated.

To achieve these and other advantages and in accordance with the purpose of the present invention, as embodied and broadly described herein, there is provided an event notification method in a wireless communications system, comprising: a step in which a user sets period information on a specific event and sends a corresponding event notification request message through a client; a step in which a point in time when the server notifies the client of the corresponding event is determined if the period information is satisfied when the corresponding event is generated; and a step in which the server notifies the client of the corresponding event.

To achieve these and other advantages and in accordance with the purpose of the present invention, as embodied and broadly described herein, there is provided an event notification method in a wireless communications system, comprising: a step in which a specific client sends a server an event notification message including period information with respect to a specific event notification; a step in which the server monitors generation of the event; a step in which the server determines whether or not a point of time when the corresponding event is generated satisfies the period information; and a step in which the server sends the event notification message to the client if the point of time when the corresponding event is generated satisfies the period information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to non-limiting exemplary embodiments of the present invention, examples of which are illustrated in the accompanying drawings.

In the event notification method in accordance with the present invention, an SIP-based client sends a server an event notification request message of which header includes a notification request with respect to a specific event and period information on a corresponding event notification, and the server having received the event notification request message notifies the client of the corresponding event according to the period when the corresponding event is generated. Here, the event notification request message can be referred to as a SUBSCRIBE message.

The period information is a minimum time interval within which the corresponding event is notified. If the minimum time interval does not expire though the corresponding event is generated again after an event notification, the corresponding event generation is not notified. That is, when the requested event is generated within the minimum time interval, the server allows only one event notification to be generated within the minimum time interval by notifying the client of the event generation after the minimum time interval expires.

The period information may include both the minimum time interval and a maximum time interval, not the minimum time interval only. When the period information includes both the minimum time interval and the maximum time interval, the server may arbitrarily notify an event between the minimum time interval and the maximum time interval. That is, when the period information has not a specifically designated value but has a permitted range, the server determines the period.

In the present invention, the user can determine the period information included in the subscribe message the SIP-based client transmits.

In the present invention, when an event to which a specific client has subscribed to is generated, the server should notify the client about the generation of the subscribed event within the minimum time interval or between the minimum time interval and the maximum time interval. Here, the setting of the event notification is maintained during a period of effective time.

Figure 1:
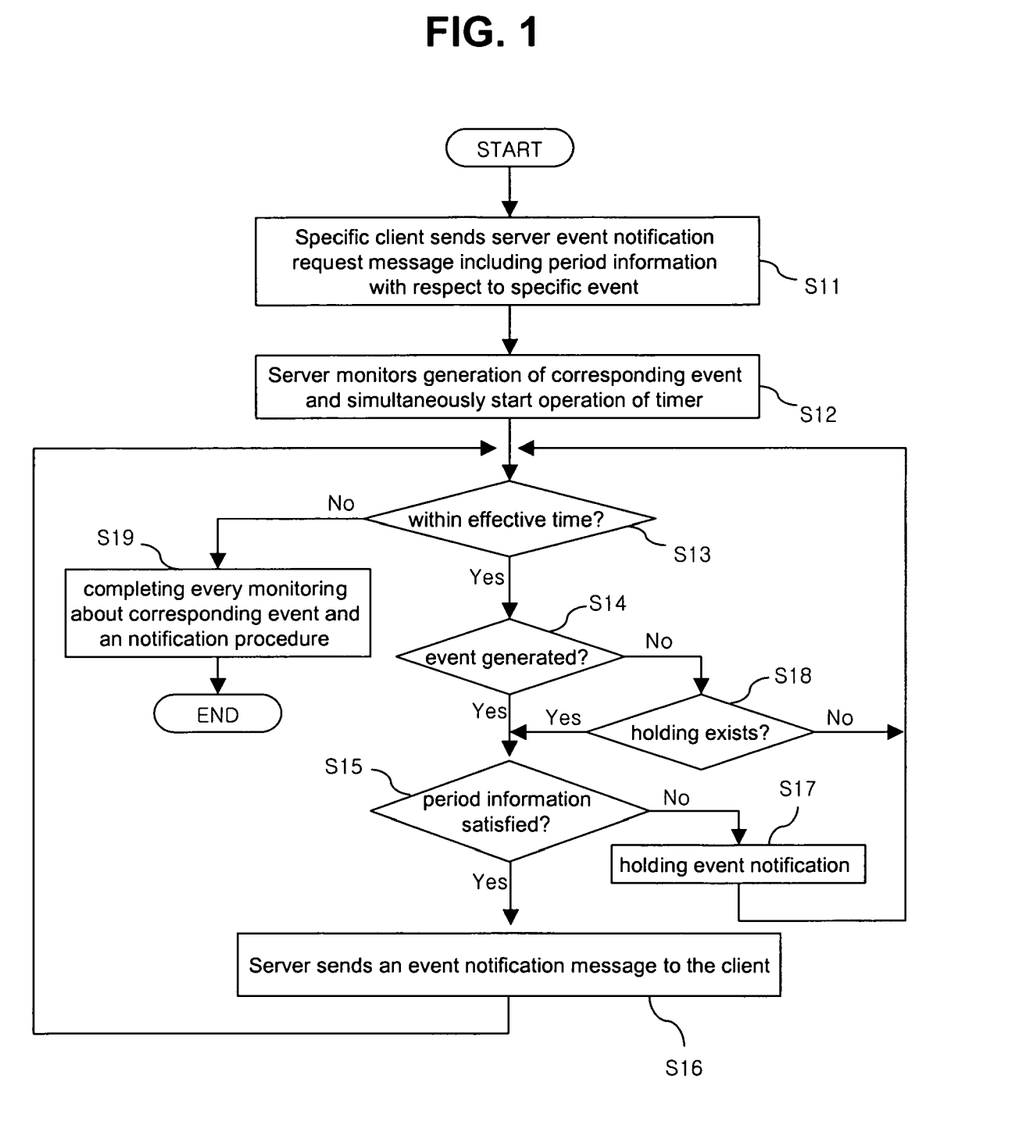
FIG. 1 a flowchart illustrating an event notification method in accordance with the present invention.

FIG. 1 a flowchart illustrating an event notification method in accordance with the present invention.

A specific client transmits to a server, a subscribe message requesting a notification with respect to generation of a particular event (S11). A header of the subscribe message may include period information to notify the client of the event generation.

That is, the period information for the event notification includes a minimum time interval within which the generation of a corresponding event that is (voluntarily) set by the user is notified, or includes the minimum time interval and a maximum time interval.

The server checks the event, the period information and the effective time transmitted through the subscribe message, and monitors whether or not the event set by the client is generated and simultaneously operates an internal timer (S12).

The server determines whether the effective time expires or not (S13). The server determines whether or not the event set by the client is generated if the effective time does not expire (S14).

When the event is not generated, the server continuously monitors event generation within the effective time.

When the event is generated, the server determines whether a point in time when the event is generated satisfies the period information included in the subscribe message (S15). When it satisfies the period information, the server notifies the corresponding client setting the event notification of a notification message indicating the event generation (S16).

If the point in time when the event is generated does not satisfy the period information, the server holds the event notification until the point in time satisfies the period information (S17). At this time, after the server holds the event notification, the server determines whether the corresponding event is generated again until the point in time satisfies the period information.

That is, the server holding the event notification checks whether the effective time expires or not (S13). If the effective time does not expire, the server determines whether the corresponding event is generated again (S14). If the corresponding event is not generated again, the server determines whether there is a message which is held in accordance with the corresponding event (S18). If the held message exist, the server determines whether a current point of time satisfies the period information (S15). If the current point of time satisfies the period information, the server sends an event notification message to the client (S16). If the current point of time does not satisfy the period information, the procedure is repetitively performed until the effective time expires or until the current point of time satisfies the period information. And if the message held with respect to the corresponding event does not exists, the server checks whether the effective time has expired, and then monitors the event generation.

If the effective time about the event expires, the server terminates every operation to monitor the generation of the corresponding event and terminates an event notification (S19).

The effective time is a temporal effective period at which the corresponding event notification can be performed. If the period information and the effective time exist at the same time, the corresponding event notification is performed during the effective time at each period. If the effective time expires, the corresponding event notification is terminated.

The present invention may be configured to allow only one event notification to be generated within a particular time by setting a minimum time interval within which a corresponding event is notified.

Figure 2:
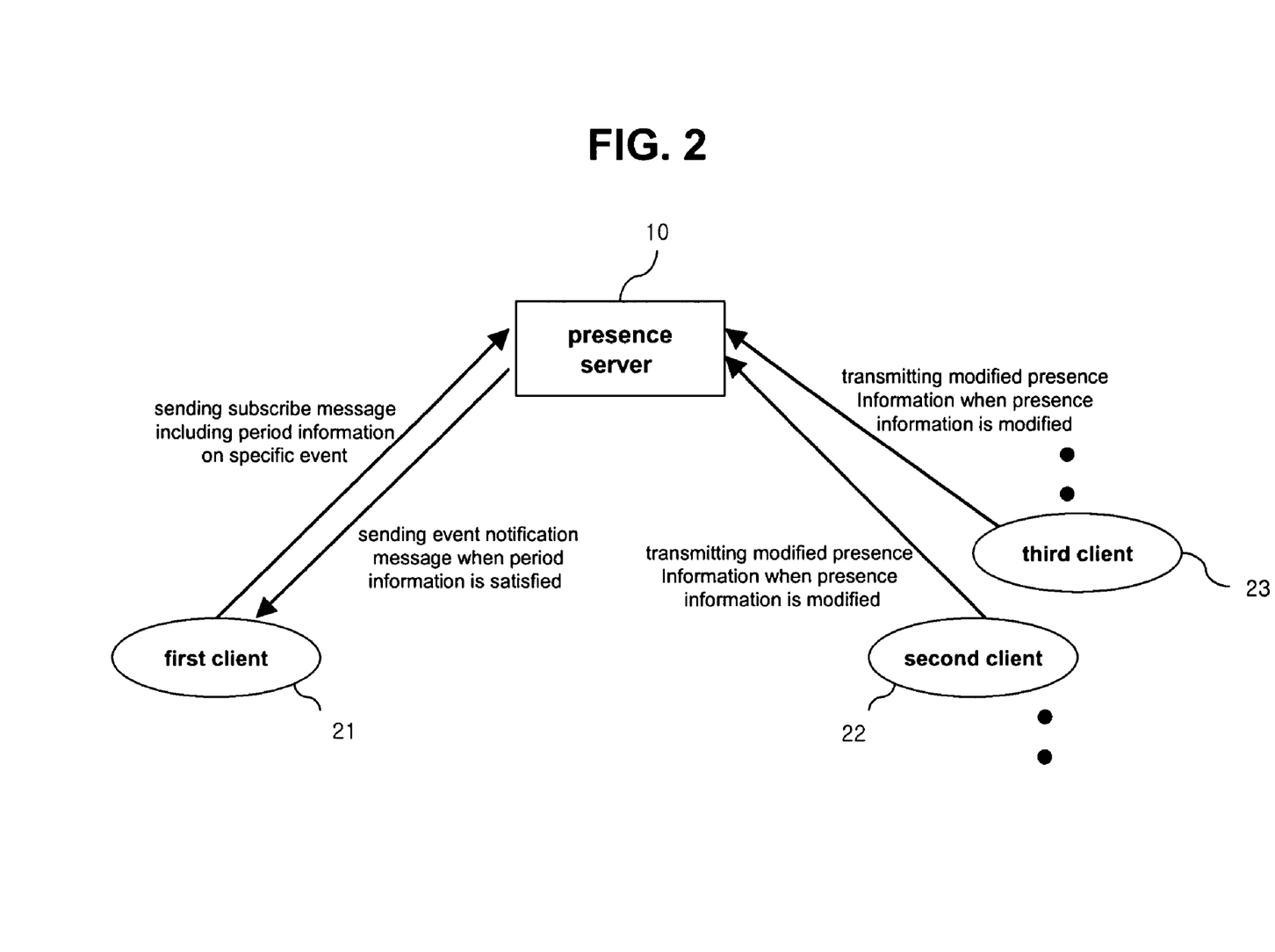
FIG. 2 is a diagram illustrating a construction of a system for implementing one embodiment of the event notification method in accordance with the present invention.

FIG. 2 is a diagram illustrating a construction of a system for implementing an event notification method in a wireless communications system in accordance with the present invention, in which an embodiment is shown based on a service in which modification of user presence information is an event.

The system sends a subscribe message to a presence server 10 in order to request a notification of presence information on another client at particular time intervals. The system includes SIP-based clients 21, 22 and 23 which transmit modified presence information to the presence server 10 if their own presence information is modified, and the presence server 10 which notifies a corresponding client of the presence information of the clients 21, 22 and 23 at the particular time intervals.

The subscribe message includes an event requesting presence information on another clients and period information by which the corresponding client is notified of the event. At this time, the period information includes a minimum time interval or a maximum time interval within which the client is notified of generation of the corresponding event, or a permitted range.

The event notification method of the wireless communications system having such structure will be described in more detail hereafter.

First, it is assumed that the first client 21 requests presence information of clients included in its own buddy list, and the clients included in the buddy list are the second client 22 and the third client 23.

The first client 21 sends a subscribe message to the presence server 10 by including an event of requesting presence information of the clients and period information in relation to a notification of the event in a header of the subscribe message. At this time, it is assumed that the period information is the minimum time interval within which the presence information of the second client 22 and the third client 23 is notified.

When its presence information is modified, the second client 22 or the third client 23 transmits the modified presence information to the presence server 10. The presence server 10 checks the period information set by the first client 21 in order to transmit the modified presence information to the first client 21.

The presence server 10 determines whether a current point of time has elapsed as long as the minimum time interval from a time at which the corresponding event has previously been notified. If the current point of time has not expired within the minimum time interval, the sever modifies the presence information of the second client 22 or the third client 23 into modified presence information, stores the modified presence information of the second client 22 or the third client 23, and does not send a notification message with respect to the corresponding event to the first client 21.

If the current point of time has elapsed within the minimum time interval from the previous event notification, the presence server 10 checks whether the current point of time is within an effective time range when the corresponding event notification can be performed. If the current point of time is within the effective time, the server sends the notification message including the modified presence information of the second client 22 or the third client 23 to the first client 21.

If the current point of time has elapsed by the minimum time interval from the previous event notification and also the effective time expires, the presence server 10 completes an event notification procedure of sending the first client 21 a notification message including the modified presence information of the second client 22 or the third client 23.

Figure 3:
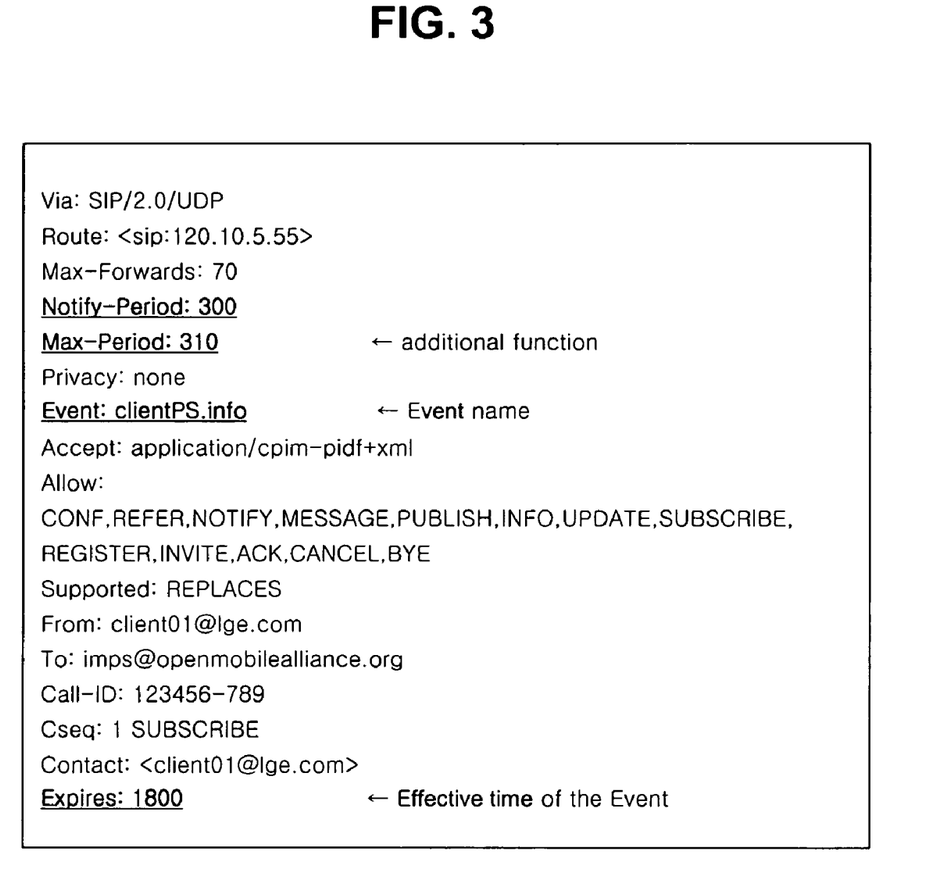
FIG. 3 is an exemplary view illustrating one embodiment of a subscribe message in accordance with the present invention.

FIG. 3 is an exemplary view illustrating one embodiment of the subscribe message in accordance with the present invention when presence information of the client is requested.

An 'Event' field is an event name, in which the client sending the subscribe message requests a notification. A 'Notify-Period' field is added to a header of the subscribe message in accordance with the present invention, and a temporal period at which the client is notified of an event when the event set in the 'Event' field is generated.

For instance, if the 'Notify-Period' field is '300', the presence server notifies the client of presence information about other clients every three hundred seconds. If the 'Notify-Period' field is '0', the presence server notifies the presence information of another clients in real-time whenever the event is generated.

A time set in the 'Notify-Period' field can be arbitrarily set by the user, in which a time section of performing an event notification can be set by adding a 'Max-Period' field as well as one time value corresponding to the minimum time value.

An 'Expire' field defines an effective time at which the corresponding event notification is implemented.

Figure 4:
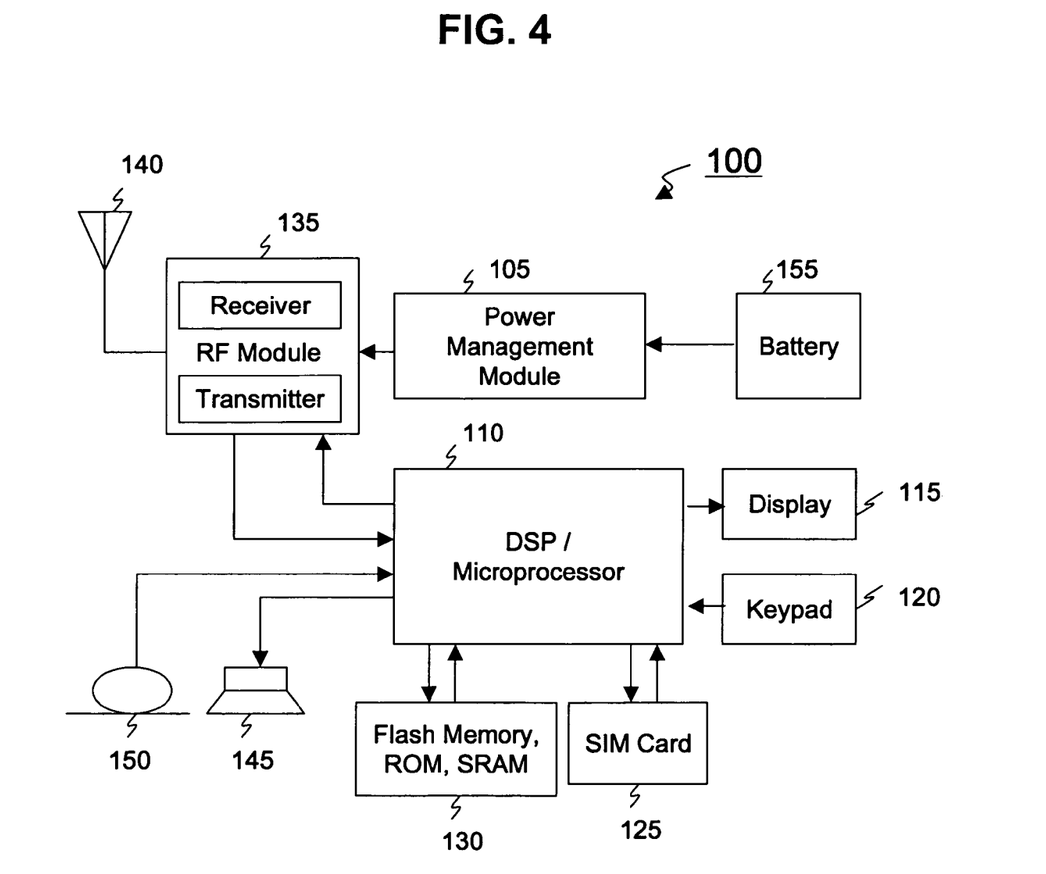
FIG. 4 is a block diagram illustrating a construction of a client in accordance with an embodiment of the present invention.

FIG. 4 is a block diagram illustrating a construction of a client (e.g., mobile terminals) in accordance with an embodiment of the present invention.

The client 21, 22, or 23 according to the present invention, namely, a mobile terminal 100 may include a processing unit 110 such as a microprocessor or digital signal processor, an RF module 135, a power management module 105, an antenna 140, a battery 155, a display 115, a keypad 120, a storage unit 130 such as a flash memory, ROM or SRAM, a speaker 145 and a microphone 150. A Subscriber Identity Module (SIM) card 125 is optional.

A user enters instructional information, such as a telephone number, for example, by pushing the buttons of a keypad 120 or by voice activation via the microphone 150. The processing unit 110 receives and processes the instructional information to perform the appropriate function, such as to dial the telephone number. Operational data may be retrieved from the SIM card 115 or the storage unit 130 to perform the function. Furthermore, the processing unit 110 may display the instructional and operational information on the display 115 for the user's reference and convenience.

The processing unit 110 issues instructional information to the RF module 135, to generate radio signals comprising voice communication data or a subscription message including instructional information (e.g., period information for a specific event or the like) input by the user. Such signals or message are then transmitted to the server 10 via the RF module 135. The RF module 135 comprises a receiver and a transmitter to receive and transmit radio signals. The antenna 140 facilitates the transmission and reception of radio signals. Upon receiving radio signals from a base station, the RF module 135 may forward and convert the signals to into baseband frequencies for processing by the processing unit 110. The processed signals would be transformed into audible or readable information outputted via the speaker 145, for example, if the radio signals are destination calls.

The processing unit 110 is adapted to send state information of the terminal to the server 10 or to store message history data of even notification messages received from other users or the server 10 in the storage unit 130. The processing unit 110 is also adapted to receive a conditional request for message history data input by the user, process the conditional request to read message history data corresponding to the conditional request from the storage unit, and output the message history data to the display unit 115. The storage unit 130 is adapted to store message history data of the received messages and the transmitted messages.

As the specific event is generated, upon receiving the event notification message from the server 10, the processing unit 110 updates state information of clients (e.g., the second client 22 and the third client 23) included in the user's buddy list with reference to the received event notification message. The processing unit 110 also outputs the updated information to the display 115 to allow the user to recognize the change in the states of the clients (e.g., the second client 22 and the third client 23).

As described herein, the event notification method in the wireless communications system in accordance with the present invention can reduce the amount of data transmitted in over the wireless interface in comparison to a related art method of performing an event notification whenever an event is generated.

In addition, the event notification method in the wireless communications system in accordance with the present invention can improve transmission efficiency since the number of notifications with respect to an event which is frequently generated.

In addition, the event notification method in the wireless communications system in accordance with the present invention can guarantee an event notification being performed at or near real-time by allowing the user to adjust a time interval for the event notification within a range which can guarantee the event being generated in real time, and simultaneously enhance the user's convenience since the event is automatically notified when the event is generated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An event notification method in a wireless communications system, the method comprising:

sending from a client to a server an event notification request message including period information set by a user about an event notification message of a corresponding specific event; and sending the event notification message from the server to notify the client of the generation of the corresponding specific event when the server determines that the corresponding specific event was generated at a point of time that satisfies the period information, wherein the server determining that the corresponding specific event was generated comprises determining whether an effective time period during which the corresponding specific event can be generated expires and terminating every operation with respect to the corresponding specific event when the effective time period expires, wherein the period information is arbitrarily set by the user of the client, is a minimum time interval or a permitted time range within which the client receives the event notification message, and corresponds to a period of time between successive event notification messages, wherein the server notifies the client at the end of the period of time when the corresponding specific event has been generated since a previously sent event notification message, wherein the server allows one event notification message to be sent to the client when a plurality of corresponding specific events has been generated since the previously sent event notification message, wherein the server holds the event notification message until the period information is satisfied before sending the held event notification message to the client, and wherein the server monitors whether an existing event notification message is being held at the server when the specific event has not been generated.

2. The method of claim 1, wherein the period information is included in a header of the event notification request message.

3. An event notification method in a wireless communications system, the method comprising:

setting period information at a client about an event notification message of a specific event and sending to a server a corresponding event notification request message through the client;

determining at the server whether a point of time satisfies the period information when the specific event is generated to notify the client of the generation of the specific event; and notifying the client of the specific event, wherein the server determines that the specific event was generated by determining whether an effective time period during which the specific event can be generated expires and the terminates every operation with respect to the specific event when the effective time period expires, wherein the period information is arbitrarily set by a user of the client, is a minimum time interval or a permitted time range within which the client receives the event notification message, and corresponds to a period of time between successive event notification messages, and wherein the server notifies the client at the end of the period of time when the specific event has been generated since a previously sent event notification message, wherein the server allows one event notification message to be sent to the client when a plurality of specific events has been generated since the previously sent event notification message, wherein the server holds the event notification message until the period information is satisfied before sending the held event notification message to the client, and wherein the server monitors whether an existing event notification message is being held at the server when the specific event has not been generated.

4. The method of claim 3, wherein the period information is added to a header of the event notification request message.

5. An event notification method in a wireless communications system, comprising:

sending from a specific client to a server an event notification request message including period information with respect to an event notification message of a specific event;

monitoring at the server whether the specific event is generated, wherein monitoring whether the specific event is generated comprises determining whether an effective time period during which the specific event can be generated expires and terminating every operation with respect to the specific event when the effective time period expires;

determining at the server whether a point of time when the specific event is generated satisfies the period information; and sending from the server the event notification message to the specific client when the point of time of the generated specific event satisfies the period information, wherein the period information is arbitrarily set by a user of the specific client, is a minimum time interval or a permitted time range within which the specific client receives the event notification message, and corresponds to a period of time between successive event notification messages, wherein the server notifies the specific client at the end of the period of time when the specific event has been generated since a previously sent event notification message, wherein the server allows one event notification message to be sent to the specific client when a plurality of specific events has been generated since the previously sent event notification message, wherein the server holds the event notification message until the period information is satisfied before sending the held event notification message to the specific client, and wherein the server monitors whether an existing event notification message is being held at the server when the specific event has not been generated.

6. The method of claim 5, wherein the event notification request message requests presence information of clients corresponding to a buddy list belonging to a user at the client.

7. The method of claim 5, wherein the server is a presence server.

8. The method of claim 5, wherein the period information is added to a header of the event notification request message.

9. The method of claim 5, wherein the server monitors generation of the specific event when the effective time period has not expired.

10. The method of claim 5, wherein the period information is a minimum time interval within which the client is notified of the specific event.

11. The method of claim 5, wherein the period information is a periodic time range in which the client can be notified of the specific event.

12. An event notification method in a client, the method comprising:

generating a particular event notification request message including period information related to an event notification message of a specific event and transmitting the generated particular event notification request message to a server; and receiving an event notification message from the server when the specific event is generated at a point of time that satisfies the period information, wherein the server determines that the specific event was generated by determining whether an effective time period during which the specific event can be generated expires and the terminates every operation with respect to the specific event when the effective time period expires, wherein the period information is arbitrarily set by a user of the client, is a minimum time interval or a permitted time range within which the client receives the event notification message, and corresponds to a period of time between successive event notification messages, wherein the server notifies the client at the end of the period of time when the specific event has been generated since a previously sent event notification message, wherein the client is allowed to receive one event notification message from the server when a plurality of specific events has been generated since the previously sent event notification message, and wherein the server holds the event notification message until the period information is satisfied before sending the held event notification message to the client and the server monitors whether an existing event notification message is being held when the period information has not been satisfied.

13. The method of claim 12, wherein the period information is included in a header of the event notification request message.

14. A mobile communications terminal configured to communicate with a wireless communications system for performing an event notification, the terminal comprising:

an input unit to receive from a user period information related to an event notification message of a specific event;

a processing unit to generate an event notification request message including the period information and to transmit the event notification request message to a server; and a display to display an event notification message received from the server when the specific event is generated at a point of time that satisfies the period information, wherein the server determines that the specific event was generated by determining whether an effective time period during which the specific event can be generated expires and the terminates every operation with respect to the specific event when the effective time period expires, wherein the period information is arbitrarily set by the user of a client, is a minimum time interval or a permitted time range for performing the event notification to the client, and corresponds to a period of time between successive event notification messages, wherein the server notifies the client at the end of the period of time when the specific event has been generated since a previously sent event notification message, wherein the terminal is allowed to receive one event notification message from the server when a plurality of specific events has been generated since the previously sent event notification message, and wherein the server holds the event notification message until the period information is satisfied before sending the held event notification message to the client and the server monitors whether an existing event notification message is being held when the period information has not been satisfied.

15. The terminal of claim 14, wherein the processing unit includes the period information in a header of the event notification request message.

* * * * *